Aug. 24, 1943.    C. C. ALVORD    2,327,486
GRINDING MACHINE CARRIAGE RECIPROCATING MECHANISM
Filed July 5, 1941    4 Sheets-Sheet 1
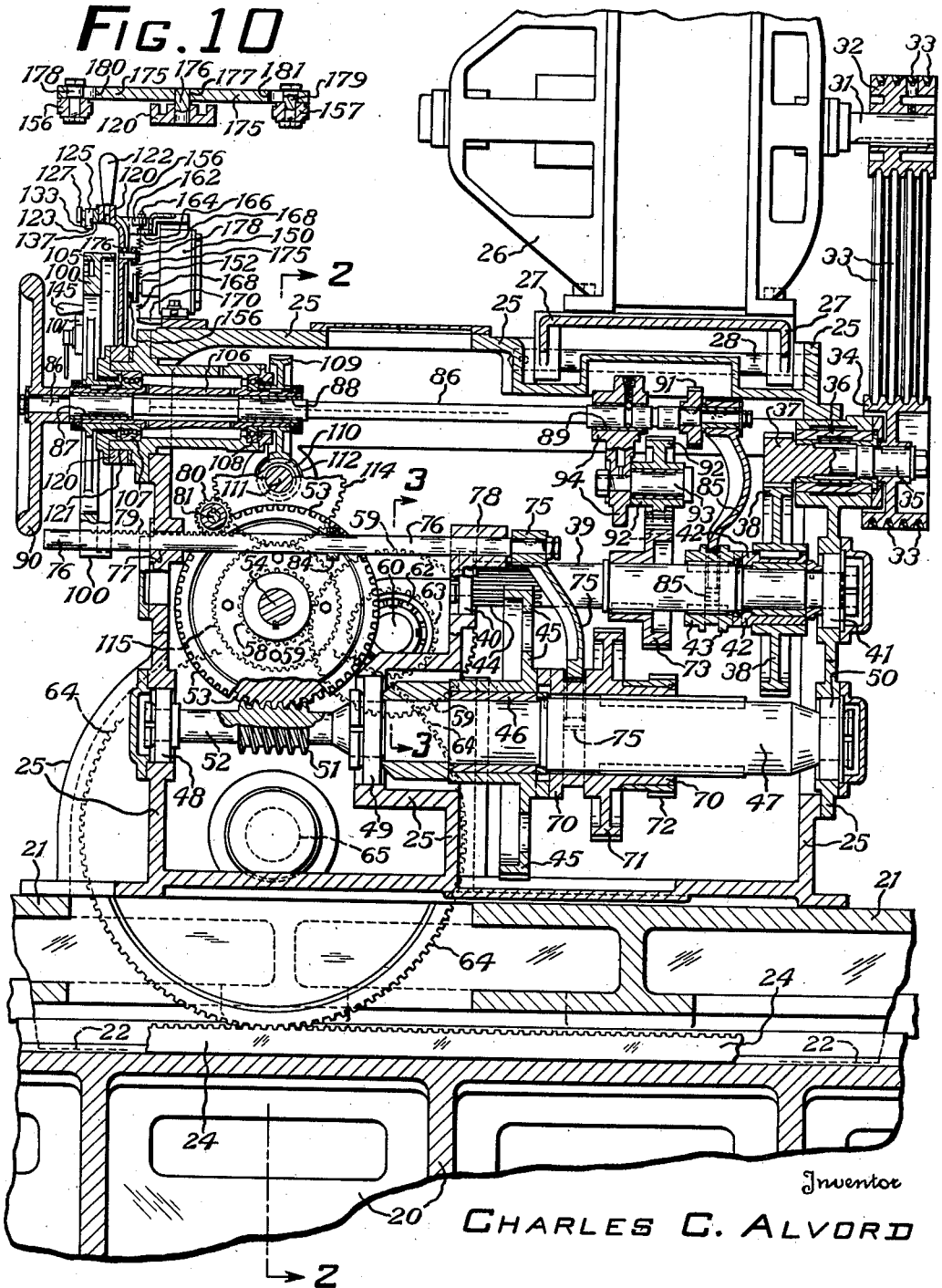
Inventor
CHARLES C. ALVORD
By Harold W. Eaton
Attorney Aug. 24, 1943.  C. C. ALVORD  2,327,486
GRINDING MACHINE CARRIAGE RECIPROCATING MECHANISM
Filed July 5, 1941  4 Sheets-Sheet 2
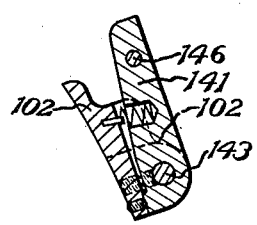
FIG. 12
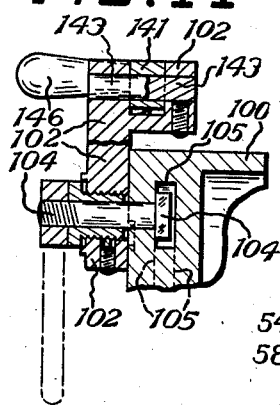
FIG. 11
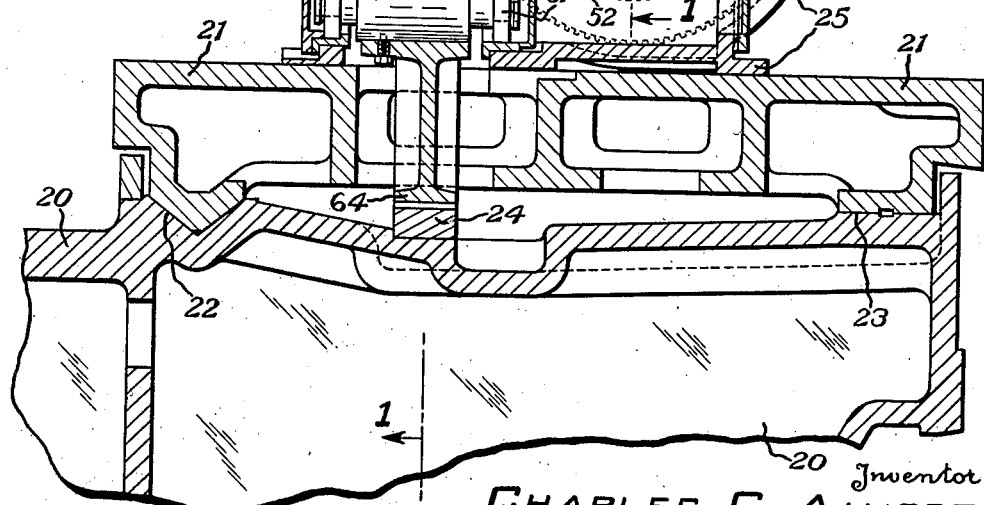
FIG. 3
FIG. 2
Inventor
CHARLES C. ALVORD
By Harold W. Eaton
Attorney Aug. 24, 1943.                C. C. ALVORD                2,327,486
            GRINDING MACHINE CARRIAGE RECIPROCATING MECHANISM
                    Filed July 5, 1941           4 Sheets-Sheet 3

FIG. 4

Inventor
CHARLES C. ALVORD
By Harold W. Eaton Attorney

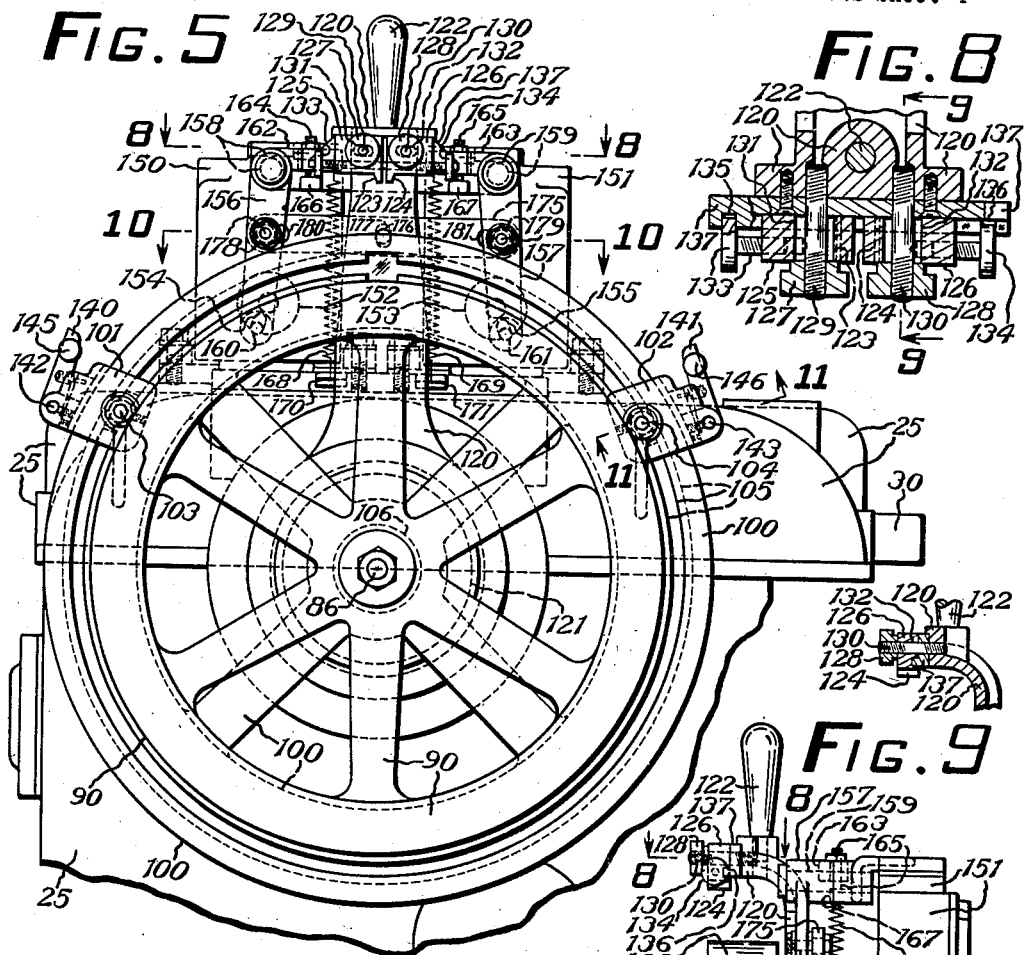

Patented Aug. 24, 1943

2,327,486

UNITED STATES PATENT OFFICE 2,327,486

GRINDING MACHINE-CARRIAGE RECIPROCATING MECHANISM

Charles C. Alvord, Worcester, Mass., assignor to Norton Company, Worcester, Mass., a corporation of Massachusetts Application July 5, 1941, Serial No. 401,071

10 Claims. (Cl. 51—231)

The invention relates to grinding machines, and more particularly to an electrically driven grinding wheel traversing mechanism.

One object of the invention is to provide a simple and thoroughly practical motor driven traversing mechanism for a grinding wheel carriage. Another object of the invention is to provide an electrical control mechanism for a grinding wheel carriage whereby the movement of the grinding wheel carriage may be readily controlled, that is, the carriage either started toward the right or toward the left, inched or jogged toward the right or toward the left, or stopped, as desired, by a push button control system. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings, in which is shown one of various possible embodiments of the mechanical features of this invention, Fig. 1 is a fragmentary longitudinal vertical sectional view, taken approximately on the line 1—1 of Fig. 2, through a grinding wheel carriage, showing the electrically driven traversing and reversing mechanism therefor;

Fig. 2 is a cross sectional view, taken approximately on the line 2—2 of Fig. 1;

Fig. 3 is a fragmentary sectional view, taken approximately on the line 3—3 of Fig. 1;

Fig. 4 is an electrical wiring diagram combined with an elevation of the reversing switches and their actuating mechanism;

Fig. 5 is a fragmentary front elevation of the reversing control mechanism, on an enlarged scale;

Fig. 6 is a fragmentary plan view of the mechanism as shown in Fig. 5;

Fig. 7 is a fragmentary plan view of the mechanism as shown in Fig. 5;

Fig. 8 is a fragmentary sectional view, on an enlarged scale, taken approximately on the line 8—8 of Figs. 5 and 7;

Fig. 9 is a fragmentary sectional view taken approximately on the line 9—9 of Fig. 8;

Fig. 10 is a fragmentary horizontal sectional view, taken approximately on the line 10—10 of Fig. 5;

Fig. 11 is a fragmentary sectional view, on an enlarged scale, taken approximately on the line 11—11 of Fig. 5, through one of the reversing dogs; and Fig. 12 is a fragmentary vertical sectional view, on an enlarged scale, taken approximately on the line 12—12 of Fig. 7, through one of the reversing dogs.

A portion of a grinding machine has been illustrated in the drawings, comprising a base 20 which supports a longitudinally reciprocable grinding wheel carriage 21 on a V-way 22 and a flat way 23. A rack bar 24 extends longitudinally relative to the base 20 and is fixedly mounted thereon.

A motor driven carriage reciprocating mechanism is supported on the carriage 21 within a casing or housing 25. A reversible electric motor 26 is mounted on an adjustable pivotally mounted motor support 27. The motor support 27 is supported at one end on a rock shaft 28 which in turn is fixedly supported on the upper portion of the casing 25. An adjusting screw 29 is screw threaded through the motor support 27 and bears against a lug 30 projecting from the casing 25 by means of which the motor 26 may be adjusted to tension the driving belts. The motor 26 is provided with an armature shaft 31 having a multi-V-groove pulley 32 mounted thereon. The pulley 32 is connected by a plurality of V-belts 33 with a multi-V-groove pulley 34 which is supported on a rotatable shaft 35. The shaft 35 is journalled in a bearing 36 carried by the casing 25. A pinion 37 is formed on the inner end of the shaft 35 which meshes with a gear 38 which is rotatably supported on a shaft 39. The shaft 39 is journalled in bearings 40 and 41 which are supported by the casing 25. The gear 38 is keyed to a rotatable sleeve 42 which is formed with clutch teeth on its left-hand end (Fig. 1) and is arranged to be clutched to the shaft 39 by means of a slidably keyed clutch member 43 which is actuated in a manner to be hereinafter described.

A pinion 44 is formed adjacent to the left-hand end of the shaft 39 and meshes with a gear 45. The gear 45 is supported on a bearing sleeve 46 which is in turn rotatably supported on a rotatable shaft 47. The shaft 47 is journalled in bearings 48, 49 and 50 in the housing 25. A worm 51 is formed integral with a reduced end portion 52 of the shaft 47. The worm 51 meshes with a worm gear 53 which is keyed on a rotatable shaft 54. The shaft 54 is journalled in bearings 55, 56 and 57 which are in turn supported by the casing 25. A small gear 58 is formed integral with the shaft 54 and meshes with a gear 59. The gear 59 is mounted on a rotatable shaft 60. The shaft 60 is rotatably supported in bearings 61 and 62 (Fig. 3) carried by the casing 25. A pinion 63 is formed integral with the gear 59 and meshes with a large gear 64 which is keyed to a rotatable shaft 65. The shaft 65 is journalled in suitable bearings 66 and 67 which are fixedly supported by the casing 25. The gear 64 meshes with the rack bar 24. It will be readily apparent from the foregoing disclosure that rotary motion of the motor shaft 31 in either direction will transmit a rotary motion to the gear 64 through the gearing previously described so that the gear 64 meshing with the rack bar 24 will impart a longitudinal traversing or reciprocating movement of the grinding wheel carriage 21.

In a grinding wheel traversing mechanism of this type, it is desirable to provide a variable speed mechanism for traversing or reciprocating the carriage 21. The mechanism previously described including the pinion 44 meshing with the gear 45 serves to transmit a relatively slow movement to the carriage 21. The gear 45 is rotatably supported on the shaft 47 and in the position shown in Fig. 1 the gear 45 is locked to the shaft 47 by means of a slidably mounted clutch member 70 which is keyed to the shaft 47. The clutch member 70 is provided with a large gear 71 and a small gear 72. If it is desired to obtain a fast speed of reciprocation of the carriage 21, the clutch member 70 is moved toward the right (Fig. 1), disengaging the clutch teeth from engagement with clutch teeth formed integral with the gear 45, and is moved toward the right so that the gear 72 is meshed with the gear 38, in which position the drive from the motor 26 through the gear 38 will be transmitted directly to the gear 72 and the shaft 47 which is in turn transmitted to the gear 64 heretofore described.

If an intermediate speed of the carriage 21 is desired, the clutch member 70 is moved toward the right (Fig. 1) so that the gear 71 meshes with a gear 73 which is keyed to the shaft 39, in which position the power of the motor 26 will be transmitted from the shaft 39 through the gear 73 and the gear 71 to rotate the shaft 47 which in turn is transmitted through the gear mechanism above described to rotate the gear 64 at an intermediate speed to cause an intermediate reciprocatory speed of the grinding wheel carriage 21.

A manually operable clutch shifting mechanism is provided for the clutch 70, comprising a yoked member 75 which is fixedly mounted on one end of a slidably mounted rod 76. The rod 76 is slidably journalled in bearings 77 and 78 formed in the casing 25. A rack bar 79 is formed on the rod 76 adjacent to its left-hand end (Fig. 1). A gear 80 which is keyed to a rotatable shaft 81 meshes with the rack 79. The shaft 81 is journalled in a bearing 82 formed integral with the casing 25. The shaft 81 supports on its outer end a manually operable hand wheel 83 by means of which the yoked member 75 may be readily shifted from the slow speed position illustrated in Fig. 1 to mesh either the gear 71 or the gear 72 with the gear 73 or the gear 38, respectively, so as to produce either a fast, intermediate or slow reciprocatory speed of the grinding wheel carriage 21.

In the operation of this carriage traversing mechanism, it is desirable to provide a manually operable control for use in setting up the machine whereby the carriage 21 may be traversed manually when desired. In case it is desired to traverse the carriage 21 manually, a yoked member 85 is provided for actuating the clutch member 43 whereby the gear 38 may be declutched from the shaft 39. The yoked member 85 is supported on the right-hand end of a slidably mounted rotatable shaft 86. The shaft 86 is rotatably and slidably journalled in bearings 87, 88 and 89 (Fig. 1). A manually operable hand wheel 90 is keyed to the outer end of the shaft or rod 86.

A gear 91 is keyed to the rod 86 and is arranged to be thrown into mesh with a gear 92. The gear 92 is rotatably supported on a stud 93 which is fixedly supported on a downwardly extending rib 94 of the casing 25. When it is desired to disconnect the power and to provide a manual traverse of the carriage 21, the hand wheel 90 is manually moved toward the left (Fig. 1), which movement shifts the shaft 86 toward the left during which movement the yoked member 85 throws the clutch member 43 out of engagement so as to declutch the gear 38 from the shaft 39. Continued movement of the shaft 86 toward the left throws the gear 91 into mesh with the gear 92. In this position of the gears, a manual traverse of the carriage 21 may be obtained by rotation of the manually operable hand wheel 90 which transmits a rotary motion through the rod 86, the gears 91, 92 and 73, the shaft 39, the pinion 44, the gear 45, the shaft 47, the worm 51, the worm gear 53, the shaft 54, the gear 58, the gear 59, the pinion 63, and the gear 64 to cause the gear 64 to roll in mesh with the fixed rack bar 24 and thus transmit a longitudinal traversing movement to the carriage 21. It will be readily apparent from the foregoing disclosure that the direction of rotation of the manually operable traverse wheel 90 will determine the direction of traversing movement of the carriage 21 relative to the base 20.

A reversing control mechanism is provided on the carriage 21 for controlling the length of the reciprocatory stroke of the carriage and the reversing of the carriage driving motor 26. A rotatable reversing control plate 100 is provided which is rotated by and in timed relation with the longitudinal reciprocating movement of the carriage 21 and is arranged to control the reversible motor 26 so as to provide the desired and predetermined reciprocatory movement of the carriage 21. A pair of reversing dogs 101 and 102 are adjustably supported by clamping T-bolts 103 and 104, the heads of which are slidably positioned within a T-shaped slot 105 formed adjacent to the periphery of the plane side face of the reversing plate 100. It will be readily apparent from the foregoing disclosure that the reversing dogs 101 and 102 may be adjusted into any positions around the periphery of the reversing plate 100 so as to facilitate adjustment of the length of the reciprocatory stroke of the carriage 21.

The reversing plate 100 is keyed to a rotatable sleeve 106 (Fig. 1) which is journalled in bearings 107 and 108 which are supported in fixed relationship with the housing 25. The plate 100 together with the sleeve 106 are connected by a reduction gear train with the carriage driving mechanism. The reduction gear train is so designed that during a maximum reciprocatory stroke of the carriage 21, the reversing plate 100 will rotate less than one complete rotation. A worm gear 109 is keyed to the inner end of the sleeve 106. The worm gear 109 meshes with a worm 110 which, as illustrated, is formed integral with a rotatable shaft 111. The shaft 111 is journalled in bearings 112 and 113 which are supported in the housing 25. A gear 114 (Fig. 2) is pinned to rotate with the worm 110 and shaft 111. The gear 114 meshes with a gear 115 which is fixedly mounted relative to the large worm wheel 53. It will be readily apparent from the foregoing disclosure that when the worm gear 53 is rotated by the worm 51 to reciprocate the carriage 21, a rotary motion will be imparted through the gear 115, the gear 114, the worm 110, and the worm gear 109 to rotate the sleeve 106 and the reversing plate 100 which carries the reversing dogs 101 and 102.

A reversing lever 120 is pivotally supported on a cylindrical hub surface 121 which is fixedly mounted relative to the casing or housing 25. A manually operable handle 122 is fixedly mounted on the upper end of the lever 120. The reversing lever 120 serves as a support for a pair of detents 123 and 124. The detents 123 and 124 are formed integral with adjustably positioned slide blocks 125 and 126, respectively, which are held in adjusted position on the lever 120 by means of clamping nuts 127 and 128. The clamping nuts 127 and 128 are screw threaded onto studs 129 and 130, respectively, which are fixedly supported on the lever 120 and pass through elongated slots 131 and 132, respectively, in the adjustably positioned blocks 125 and 126, respectively. Adjusting screws 133 and 134 are screw threaded into the adjustable blocks 125 and 126, respectively, and have their heads riding in grooves 135 and 136 formed in an arm 137 which is fixedly mounted adjacent to the upper end of the reversing lever 120 to facilitate independent adjustment of the detents 123 and 124 relative to the lever 122. It will be readily apparent from the foregoing disclosure that by loosening the clamping nuts 127 and 128 and adjusting the screws 133 and 134, the blocks 125 and 126 together with the detent 123 and 124, respectively, may be readily and precisely adjusted relative to the lever 122 as desired, after which they may be clamped in adjusted position by tightening the clamping nuts 127 and 128.

Each of the dogs 101 and 102 is provided with pivotally mounted levers 140 and 141 which are supported on studs 142 and 143, respectively. The studs 142 and 143 are fixedly supported on the reversing dogs 101 and 102. The ends of the dog levers 140 and 141 are arranged in the path of the detents 123 and 124, respectively, so that when the reversing plate 100 is rotated in either direction, the rotary motion thereof will continue until either the end of the dog lever 140 or the dog lever 141 engages the detent 123 or the detent 124, respectively, to rock the reversing lever 120 to change the direction of traversing movement of the carriage 21 in a manner to be hereinafter described. The dog levers 140 and 141 are biased to an operating position by tension springs which are interposed between the dogs 101 and 102 and the dog levers 140 and 141, respectively. A pair of manually operable knobs 145 and 146 are fixedly mounted on the dog levers 140 and 141, respectively, by means of which the dog levers 140 and 141 may be depressed, that is, their operative ends moved toward the periphery of the reversing plate 100 so that they are out of the path of the detent 123 or 124, respectively, thus allowing the reversing plate 100 to rotate beyond its normal movement, when desired, without actuating the reversing lever 120.

A pair of normally closed limit switches 150 and 151 are provided for controlling the reversal of the motor 26 so as to reverse the direction of travel of the grinding wheel carriage 21 as desired. The limit switches 150 and 151 are provided with actuating knobs 152 and 153 each of which is provided with elongated slots or notches 154 and 155, respectively. A pair of pivotally mounted levers 156 and 157 are supported on relatively fixed studs 158 and 159, respectively. The lower ends of the levers 156 and 157 are provided with pins 160 and 161, respectively, which ride within the slots 154 and 155, respectively. The levers 156 and 157 are preferably formed as bell crank levers each of which is provided with a horizontally extending short arm 162 and 163, respectively. The short arms 162 and 163 are provided with adjustable stop screws 164 and 165, respectively, which are arranged to engage stop lugs 166 and 167 so as to limit the swinging motion of the bell crank levers 156 and 157. A pair of tension springs 168 and 169 are connected between the short arms 162 and 163, respectively, and brackets 170 and 171, respectively, which are fixed relative to the housing 25. The springs 168 and 169 serve normally to hold the stop screws 164 and 165 in engagement with the lugs 166 and 167, thus maintaining the downwardly extending arms or levers 156 and 157 in the position illustrated in Fig. 4 to maintain the limit switches 150 and 151 in a closed position.

It is desirable to connect the limit switches 150 and 151 so that they may be automatically actuated by movement of the reversing lever 120. A link 175 is provided to interconnect the reversing lever 120 with the levers 156 and 157, respectively. A pin or stud 176 is fixedly supported on the reversing lever 120 and rides within an elongated slot 177 formed in the link 175. A stud 178 carried by the lever 156 and a stud 179 carried by the lever 157 ride within elongated slots 180 and 181, respectively, formed in the link 175. As illustrated in Fig. 10, the studs 178 and 179 are positioned to engage the outer ends of the elongated slots 180 and 181, respectively. This position of the studs may be readily obtained by adjustment of the stop screws 164 and 165, respectively. It will be readily apparent from the foregoing disclosure that due to the lost motion facilitated by the elongated slots 180 and 181, the reversing lever 120 may be moved either in a clockwise or in a counterclockwise direction, during which movement only one of the switches 150 or 151 is actuated. Due to the tension of the springs 168 and 169, the levers 156 and 157 for actuating the switches 150 and 151, respectively, are normally held in a central position, thus maintaining the reversing lever 120 in a central position with both of the limit switches closed.

A diagrammatic illustration has been shown in Fig. 4, showing the control mechanism for the reversible motor 26. Electric power is supplied from an outside source, such as represented by the power lines 185. A manually adjustable rheostat 186 is provided for regulating the speed of the motor 26 whereby the speed of traverse or reciprocation of the grinding wheel carriage 21 may be readily adjusted as desired. A plurality of push button switches are provided for controlling the motor 26. A pair of push button switches 187 and 188 are provided for starting the motor 26 so as to traverse the carriage 21 toward the left or toward the right, respectively. Similarly, a pair of push button switches 189 and 190 are provided whereby the motor 26 may be inched or jogged to move the carriage 21 toward the left or toward the right, respectively, in positioning the carriage and the grinding wheel supported thereby. A push button switch 191 is provided to stop the traverse or reciprocation of the grinding wheel carriage 21 at any time.

A control relay switch 192 is provided for controlling a magnetic relay type switch 193 for producing a movement of the grinding wheel carriage 21 toward the left or to control a magnetic relay type switch 194 which controls the movement of the grinding wheel carriage 21 toward the right.

If it is desired to start the movement of the carriage 21 toward the left, the "start left" push button switch 187 is closed, which movement energizes and actuates the control relay 192 and closes a circuit which energizes and actuates the magnetic relay switch 193 to start the motor 26 so as to traverse the carriage 21 toward the left. Similarly, if it is desired to start the movement of the carriage toward the right, the "start right" push button switch 188 is closed to energize and actuate the control relay 192 and closes a circuit which energizes and actuates the magnetic relay type switch 194 to start the movement of the carriage 21 toward the right.

The control relays 192 together with the relays 193 and 194 are interconnected with the push button switches 187 and 188 so that when it is desired to start the table moving toward the left, the push button switch 187 is closed, that is, moved toward the left (Fig. 4), which movement closes a circuit to energize the control relay 192 and at the same time to energize the relay 193 so as to start the motor 26 in a direction to traverse the work carriage toward the left. The closing of the magnetic relay 193 opens a circuit to render the relay 194 inoperative during the traversing movement of the carriage toward the left. The carriage continues its movement toward the left until the dog mechanism previously described opens the limit switch 151 so as to break the circuit to deenergize the relay 193 which operates to energize the relay 194 which reverses the current to start the motor 26 in the reverse direction so as to produce a reversal in direction of movement of the grinding machine carriage.

The inch control buttons 190 and 189 for movement of the carriage toward the right or toward the left, respectively, are connected directly to operate either the relay 193 or the relay 194 to rotate the motor 26 in the desired direction so as to inch the carriage a predetermined distance when desired. The inching push button switches are effective only while the push button is maintained in a closed position to hold the relays 193 or 194 closed. After the carriage has once been set in motion by the start-left or start-right buttons 187 or 188, respectively, the carriage continuously reciprocates as governed by the limit switches 150 and 151 which are controlled by the dog and reverse lever mechanism above described.

Similarly, if a short adjustment is desired to position the grinding wheel carriage 21, this may be accomplished by closing the "inch right" push button 190 or the "inch left" push button 189 to inch or jog the carriage 21 lengthwise relative to the base 20. At any time during the operation of the grinding machine, the machine may be stopped by actuating the "stop" push button 191 which opens the circuit to stop the motor 26 and thereby to stop the longitudinal reciprocatory movement of the grinding wheel carriage 21.

After the carriage 21 has been set in motion by closing either the start left switch 187 or the start right switch 188, the carriage 21 is then under the automatic control of the normally closed limit switches 150 and 151 which are successively and automatically opened at the ends of the carriage stroke as governed by the adjustable reversing dogs 101 and 102. When the reversing plate 100 rotates in a counterclockwise direction, the dog lever 141 of the reversing dog 102 will engage the detent 124 to move the reversing lever 120 in a counterclockwise direction. This movement serves to open the normally closed limit switch 151 which operates through the control relays 193 and 194 to reverse the direction of rotation of the motor 26 so as to start the carriage 21 moving in the reverse direction until the dog lever 140 of the reversing dog 101, moving in a clockwise direction, engages the detent 123 to rock the reversing lever 120 in a clockwise direction (Fig. 5). This movement serves through the link 175 and the lever 156 to open the normally closed limit switch 150. The opening of the limit switch 150 serves to actuate the control relays 193 and 194 so as to again reverse the direction of rotation of the motor 26, thus stopping the movement of the carriage in one direction and starting it in the reverse direction. The length of the reciprocatory stroke of the carriage 21 is govened by the adjustment of the reversing dogs 101 and 102 about the periphery of the reversing plate 100.

It will be readily apparent from the foregoing disclosure that the reversing lever 120, except during reversal, is maintained in a neutral or central position by the springs 168 and 169 so that both of the normally closed limit switches 150 and 151 are normally maintained in a closed position so as to facilitate inching the carriage 21 either toward the right or toward the left by closing the push button switches 189 or 190, respectively.

The operation of this improved carriage reciprocating mechanism will be readily apparent from the foregoing disclosure. Assuming the gear driving mechanism has been adjusted to give the desired speed to the carriage 21, it is merely necessary to close the push button switch 187 or 188 to start the reversible electric motor 26 to traverse the carriage 21 either toward the left or toward the right, depending upon which push button switch is actuated. The closing of either of the start buttons 187 or 188 operates through the control relay 192 to actuate either the relay 193 or the relay 194 which control the direction of rotation of the motor 26 so that the carriage 21 will start its reciprocatory movement in the desired direction. In setting up the machine, it is frequently necessary to inch or jog the grinding wheel longitudinally relative to the base to position it relative to the work piece to be ground.

Due to the construction of the reverse control mechanism, except during the period of reversal, the reversing lever 120 is maintained in a vertical or neutral position by means of the action of the springs 168 and 169, as previously described. In this position both of the limit switches 150 and 151 remain closed. In order to inch or jog the carriage 21, it is merely necessary for the operator to actuate the "inch right" push button 190 or the "inch left" push button 189, which movement serves through the relays 193 and 194 instantaneously to start the reversible motor 26 either in one direction or the other to transmit an inching or jogging movement to the carriage 21 without the necessity of having to shift the reversing lever 120. This inching or jogging movement may be obtained either toward the right or toward the left in any position of the carriage 21 except at the ends of the carriage stroke during the period of reversal. If during a grinding operation it is desirable and necessary to stop the traversing movement of the carriage 21, this may be accomplished by actuating the "stop" push button switch 191 which serves to stop the rotation of the reversing motor 26.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a grinding machine having a longitudinally movable carriage, a reversing control mechanism therefor including a pivotally mounted reversing lever, a rotatable control wheel which is rotated by and in timed relation with said carriage, adjustable reversing dogs on said wheel to engage and actuate said lever, a pair of switches each having an actuating lever, and lost motion connections between said switch levers and said reversing lever whereby one of said switches is actuated when the reversing lever is shifted in one direction and the other of said switches is actuated when the reversing lever is shifted in the other direction.

2. In a grinding machine having a longitudinally movable carriage, a reversing control mechanism therefor including a pivotally mounted reversing lever, a rotatable control wheel which is rotated by and in timed relation with said carriage, adjustable reversing dogs on said wheel, adjustable detents on said reversing lever which are engageable by said dogs, a pair of switches each having an actuating lever, and lost motion connections between said switch levers and said reversing lever whereby one of said switches is actuated when the reversing lever is shifted in one direction and the other of said switches is actuated when the reversing lever is shifted in the other direction.

3. In a grinding machine having a longitudinally movable carriage, a reversing control mechanism therefor including a reversible electric motor, a pivotally mounted reversing lever, rotatable control wheel which is rotated by and in timed relation with said carriage, adjustable reversing dogs on said wheel to engage and actuate said lever, means including a pair of switches to control said motor each having an actuating lever, connections between said reversing lever and said switch levers whereby one of said switches is actuated when the reversing lever is moved in either direction, a pair of jogging switches which are connected to jog said motor in opposite directions, and means normally to maintain said reversing lever in a central position so that the motor may be jogged in either direction.

4. In a grinding machine having a longitudinally movable carriage, a reversing control mechanism therefor including a reversible electric motor, a pivotally mounted reversing lever, a rotatable control wheel which is rotated by and in timed relation with said carriage, adjustable reversing dogs on said wheel to engage and actuate said lever, means including a pair of switches to control said motor each having an actuating lever, lost motion connections between said reversing lever and said switch levers whereby one of said switches is actuated when the reversing lever is moved in either direction, a pair of jogging switches which are connected to jog said motor in opposite directions, and means normally to maintain said reversing lever in a central position so that the motor may be jogged in either direction.

5. In a grinding machine having a reciprocable carriage, means including a reversible motor to reciprocate said carriage, a pivotally mounted reversing lever, a rotatable control wheel which is operatively connected to be rotated by and in timed relation with the longitudinal movement of the carriage, adjustable dogs on said wheel to engage and actuate said reversing lever, means including a pair of limit switches each being connected to control rotation of the carriage driving motor in one direction, an actuating lever for each of said switches, a link operatively connecting said switch levers, springs normally to hold said levers with the switches in a closed position, connections between said reversing lever and link whereby movement of said reversing lever in either direction serves to actuate one of said switches to reverse said motor and carriage, and means including a right-hand and a left-hand jogging switch for said motor and carriage, said reversing lever being normally maintained in a central position with both of the limit switches closed so that the motor and carriage may be jogged in either direction by actuation of the jogging switches.

6. In a grinding machine having a reciprocable carriage, means including a reversible electric motor to reciprocate said carriage, a rotatable control wheel which is rotated by and in timed relation with the movement of said carriage, adjustable dogs on said wheel, a pivotally mounted reversing lever which is actuated by said dogs, means including a pair of switches each being connected to control rotation of the carriage driving motor in one direction, a link operatively connecting said switches, lost motion connections between said link and switches, and connections between said reversing lever and link whereby movement of said lever in either direction serves to actuate one of said switches to reverse the motor and movement of said carriage.

7. In a grinding machine having a reciprocable carriage, means including a reversing motor to reciprocate said carriage, a rotatable control wheel which is operatively connected to be rotated by and in timed relation with the longitudinal movement of said carriage, adjustable dogs on said wheel, a pivotally mounted lever, said dogs being arranged to engage and actuate said lever, means including a pair of limit switches each being connected to control rotation of the carriage driving motor in one direction, an actuating lever for each of said switches, a link connecting said switch levers, springs normally to hold said levers with the switches in a closed position, and connections between said reversing lever and link whereby movement of the lever in either direction serves to actuate one of said switches to reverse said motor and carriage.

8. In a grinding machine having a reciprocable carriage, means including a reversible motor to reciprocate said carriage, a rotatable control wheel which is operatively connected to be rotated by and in timed relation with the longitudinal movement of the carriage, adjustable dogs on said wheel, a pivotally mounted reversing lever, said dogs being arranged to engage and actuate said lever, adjustably mounted detents on said reversing lever which are arranged in the path of said reversing dogs, means including a pair of switches each being connected to control rotation of the carriage driving motor in one direction, an actuating lever for each of said switches, and lost motion connections between said switch levers and said reversing lever whereby movement of the reversing lever in either direction serves to actuate one of said switches to reverse said motor and carriage.

9. A ginding machine carriage reversing control mechanism including a pivotally mounted reversing lever, a rotatable control wheel, adjustable reversing dogs on said wheel, adjustable detents on said reversing lever which are engageable by said dogs, a pair of switches each having an actuating lever, a link connecting said levers, connections between said link and said reversing lever, and lost motion connections between said link and each of said switch levers whereby one of said switches is actuated when the reversing lever is shifted in one direction and the other of said switches is actuated when the reversing lever is shifted in the other direction.

10. A grinding machine carriage reversing control mechanism including a pivotally mounted reversing lever, a rotatable control wheel, adjustable reversing dogs on said wheel, adjustable detents on said reversing lever which are engageable by said dogs, a pair of normally closed switches each having an actuating lever, a link connecting said levers, connections between said link and said reversing levers, and lost motion connections between said link and each of said arms whereby one of said switches is opened when the reversing lever is shifted in one direction and the other of said switches is opened when the reversing lever is shifted in the other direction.

CHARLES C. ALVORD.